(12) United States Patent
Guo et al.

(10) Patent No.: US 11,838,319 B2
(45) Date of Patent: *Dec. 5, 2023

(54) HARDWARE ACCELERATION DEVICE FOR DENIAL-OF-SERVICE ATTACK IDENTIFICATION AND MITIGATION

(71) Applicant: Fortinet, Inc., Sunnyvale, CA (US)

(72) Inventors: Zhi Guo, San Jose, CA (US); Peixue Li, Cupertino, CA (US); Xu Zhou, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,822

(22) Filed: May 2, 2022

(65) Prior Publication Data

US 2022/0263862 A1    Aug. 18, 2022

Related U.S. Application Data

(63) Continuation of application No. 16/836,540, filed on Mar. 31, 2020, now Pat. No. 11,349,866.

(51) Int. Cl.
*H04L 9/40* (2022.01)
*H04L 69/329* (2022.01)
*H04L 43/16* (2022.01)
*H04L 49/90* (2022.01)
*H04L 45/748* (2022.01)
*H04L 67/02* (2022.01)

(52) U.S. Cl.
CPC .......... *H04L 63/1458* (2013.01); *H04L 43/16* (2013.01); *H04L 45/748* (2013.01); *H04L 49/9068* (2013.01); *H04L 63/1433* (2013.01); *H04L 67/02* (2013.01); *H04L 69/329* (2013.01)

(58) Field of Classification Search
CPC ............................ H04L 63/1458; H04L 67/02
See application file for complete search history.

(56) References Cited

U.S. PATENT DOCUMENTS 8,225,399 B1 * 7/2012 Van der Merwe ...... H04L 69/22 726/23
10,623,309 B1 * 4/2020 Gampel .............. H04L 41/0894
(Continued)

*Primary Examiner* — Chirag R Patel
(74) *Attorney, Agent, or Firm* — Jaffery Watson; Mendonsa & Hamilton LLP

(57) ABSTRACT

Systems and methods for providing an integrated or Smart NIC-based hardware accelerator for a network security device to facilitate identification and mitigation of DoS attacks is provided. According to one embodiment, a processor of a network security device receives an application layer protocol request from a client, directed to a domain hosted by various servers and protected by the network security device. The application layer protocol request is parsed to extract a domain name and a path string. The hardware acceleration sub-system updates rate-based counters based on the application layer protocol request by performing a longest prefix match on the domain name and the path string. When a rate threshold associated with the rate-based counters is exceeded, a challenge message is created and transmitted to the client, having embedded therein the application layer protocol request; otherwise the application layer protocol request is allowed to pass through the network security device.

21 Claims, 11 Drawing Sheets

(56) References Cited

U.S. PATENT DOCUMENTS

| | | | |
|---|---|---|---|
| 2010/0195655 A1* | 8/2010 | Jacobson | H04L 45/748 370/392 |
| 2013/0198845 A1* | 8/2013 | Anvari | H04L 63/1458 726/25 |
| 2016/0173526 A1* | 6/2016 | Kasman | G06F 21/44 726/23 |
| 2016/0269290 A1* | 9/2016 | Chu | H04L 45/748 |
| 2019/0230116 A1* | 7/2019 | Compton | H04L 63/1458 |
| 2020/0278892 A1* | 9/2020 | Nainar | H04L 67/10 |
| 2020/0344166 A1* | 10/2020 | Roberts | H04L 49/70 |

\* cited by examiner

600

METHOD: GET
HOST: *.DOMAIN_1.COM
PATH: /PATH/EXAMPLE/FILE_NAME.HTML
602

Dest IP Address: 1.1.1.1
L4 protocol: TCP
L4 port: 80
604

HARDWARE ACCELERATION DEVICE FOR DENIAL-OF-SERVICE ATTACK IDENTIFICATION AND MITIGATION

RELATED APPLICATIONS

This application is a continuation of U.S. patent application Ser. No. 16/836,540, filed Mar. 31, 2020, and entitled "HARDWARE ACCELERATION DEVICE FOR DENIAL-OF-SERVICE ATTACK IDENTIFICATION AND MITIGATION" by Guo et al. The entirety of the aforementioned application is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network security and denial-of-service (DoS) attack identification and mitigation. In particular, embodiments of the present invention relate to providing an integrated or Smart NIC-based hardware accelerator for a network security device to facilitate identification and mitigation of DoS attacks.

Description of the Related Art

Existing DoS attack identification and mitigation mechanisms employ rate-based filtering for stand-alone and server based firewall devices. Using rate-based filtering requires defining a rate counter that involves numerical comparisons of Internet Protocol (IP) addresses and ports. Additionally, defining a layer seven (application layer) counter of the Open Systems Interconnection (OSI) model involves using string pattern matching. Fine-grained rate monitoring requires a massive number of counters to be maintained as well as associated threshold values that need to be learned periodically based on legitimate traffic. These tasks are computationally intensive.

SUMMARY

Systems and methods are described for providing an integrated or Smart NIC-based hardware accelerator for a network security device to facilitate identification and mitigation of DoS attacks. According to one embodiment, a processor of a network security device receives an application layer protocol request from a client, directed to a domain hosted by one or more servers protected by the network security device. The processor extracts a domain name and a path string from the application layer protocol request by parsing the application layer protocol request. The processor or a hardware acceleration sub-system of the network security device updates rate-based counters based on the application layer protocol request by performing a longest prefix match on the domain name and the path string. When a rate threshold associated with the rate-based counters is exceeded, a challenge message is constructed having embedded therein the application layer protocol request, and causes the challenge message to be transmitted to the client. When no rate thresholds associated with the rate-based counters are exceeded, a next stage of processing is performed, which may include allowing the application layer protocol request to pass through the network security device or performing one or more additional stages of network security processing. Upon receiving a reply to the challenge message by the processor, the embedded application layer protocol request is passed along to the next stage of processing.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
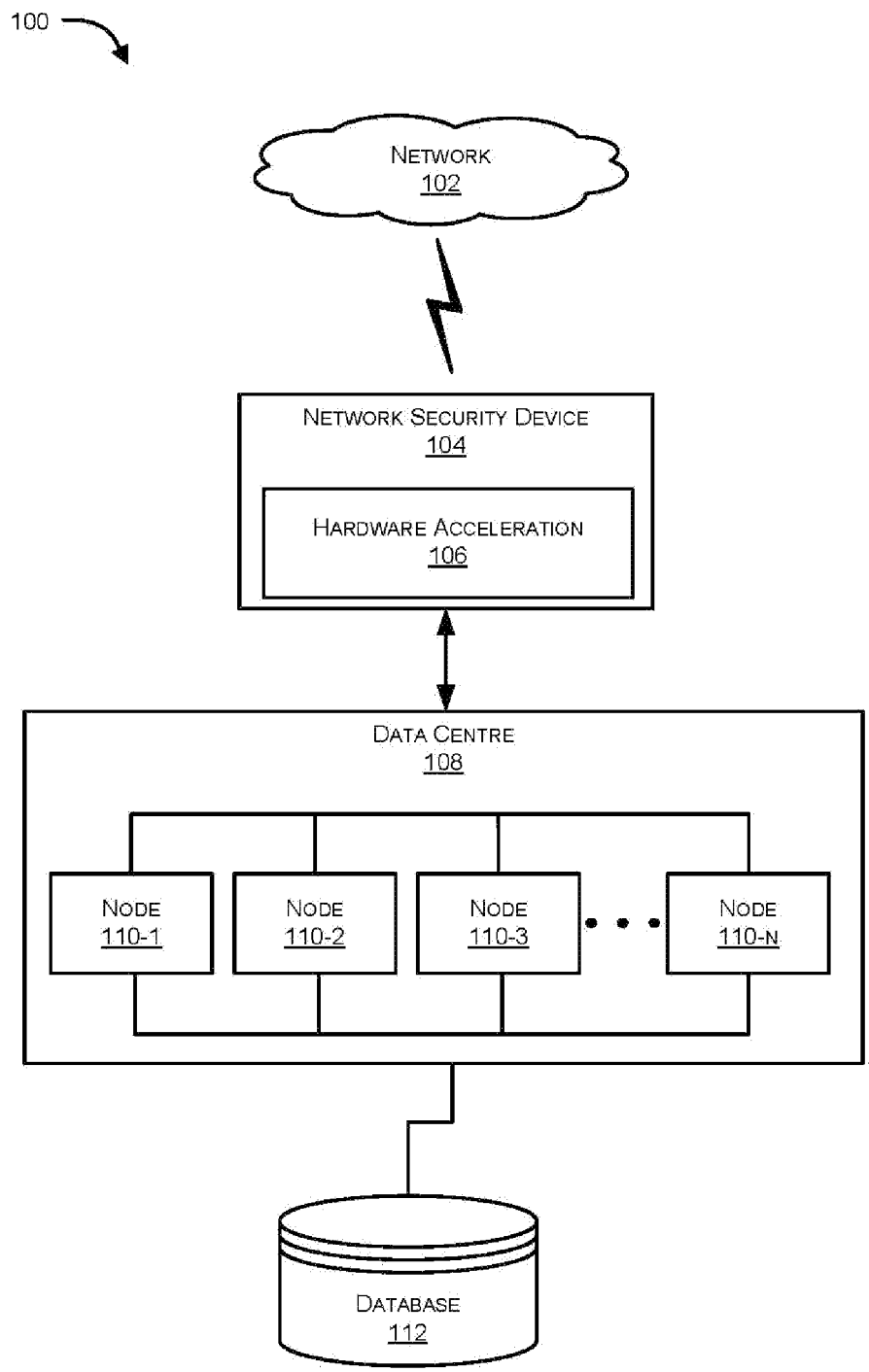
FIG. 1 is a network architecture in which aspects of the present invention may be implemented.

Systems and methods are described for hardware-accelerated DoS attack identification and mitigation. There are several independent motivating factors for the various embodiments described herein. In the context of data center servers, it is desirable to free host CPU cores from network security work load, for which users cannot be directly charged. Hardware accelerator devices offload computationally intense processing tasks from a general purpose processor to perform certain functions faster and more efficiently. The hardware accelerator devices are implemented to decrease latency and increase throughput, thereby improving overall user experience. However, due to the fluctuation of workloads within servers of data centers, hardware accelerators, such as dedicated Peripheral Component Interconnect Express (PCIe)-based boards are not always cost effective. Meanwhile, stand-alone firewall appliances, Intrusion Prevention Systems (IPSs) and layer 7 denial-of-service attack mitigation share similar fundamental computing patterns. It would be advantageous if these similar compute-intensive network security applications were able to share the same piece of hardware acceleration in a smart network interface card (NIC).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, content filtering, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various embodiments of the present disclosure, a processor of a network security device receives an application layer protocol request from a client, directed to a domain hosted by one or more servers protected by the network security device. The processor extracts a domain name and a path string from the application layer protocol request by parsing the application layer protocol request. A hardware acceleration sub-system of the network security device updates rate-based counters based on the application layer protocol request by performing a longest prefix match on the domain name and the path string. When a rate threshold associated with the rate-based counters is exceeded, a challenge message is constructed having embedded therein the application layer protocol request, and causes the challenge message to be transmitted to the client. Further, when no rate thresholds associated with the rate-based counters are exceeded, a next stage of processing is performed and includes allowing the application layer protocol request to pass through the network security device or performing one or more additional stages of network security processing. Upon receiving a reply to the challenge message by the processor, passing the embedded application layer protocol request along to the next stage of processing. For sake of brevity, while in the context of various examples described herein the application layer protocol request is assumed to be an HTTP request, those skilled in the art will appreciate that the methodologies described herein are equally applicable to other application layer protocols, including, but not limited to protocols for remote login to hosts (e.g., Telnet), protocols for file transfer (e.g., File Transfer Protocol (FTP) and Trivial FTP (TFTP)), protocols for electronic mail transport (e.g., Simple Mail Transfer Protocol (SMTP)), and protocols for networking support (e.g., Domain Name System (DNS)).

FIG. 1 is a network architecture 100 in which aspects of the present invention may be implemented. According to an embodiment, a technique for detection and mitigation of a denial of service (DoS) attack is disclosed. In an implementation, a network security device 104 along with hardware acceleration 106 can be present within a data center 108, wherein a hardware acceleration sub-system of hardware acceleration 106 can be implemented within a network interface card (NIC). Data center 108 may include multiple nodes 110-1, 110-2 . . . 110-N (which may be collectively referred to herein as nodes 110 and may be individually referred to herein as node 110) that form part of data center 108. In some embodiments, for example, in which the hardware acceleration 106 is implemented within a smart NIC, detection and mitigation of DoS attacks (or some subset of functionality associated therewith, for example, pattern matching) may be performed on behalf of one or more other nodes 110-1 . . . 110-N within data center 108 without using resources of a central processing unit (CPU) of the network security device.

In an embodiment, external devices can connect to data center 108 through a network 102, which can be a wireless network, a wired network or a combination thereof that can be implemented as one of the different types of networks, such as an Intranet, a Local Area Network (LAN), a Wide Area Network (WAN), the Internet, and the like. Further, network 102 can be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further, nodes 110 can be operatively coupled to a database 112.

According to an embodiment, network security device 104 can receive an application layer protocol request from a client directed to a domain hosted by various servers protected by network security device 104. The application layer protocol request may be a Hypertext Transport Protocol (HTTP) request. The network security device can extract a domain name and a path string from the application layer protocol request by parsing the application layer protocol request. A hardware acceleration sub-system of the network security device can update rate-based counters based on the application layer protocol request by performing a longest prefix match on the extracted domain name and the path string. The longest prefix match can be performed by a pattern matching hardware module of the hardware acceleration sub-system. In addition, the pattern matching hardware module can be used to perform intrusion detection processing on network traffic received by network security device 104.

Further, when a rate threshold associated with any of the rate-based counters is exceeded, the hardware acceleration sub-system can construct a challenge message, having the application layer protocol request embedded therein, and can cause the challenge message to be transmitted and presented to an end user of the client. The challenged message can be a Hypertext Markup Language (HTML) form or a Uniform Resource Locator (URL). Upon receiving a reply to the challenge message, the embedded application layer protocol request can be passed along to the next stage of processing. As will be appreciated by those skilled in the art, when no rate thresholds associated with the rate-based counters are exceeded, a next stage of processing may be performed that includes allowing the application layer protocol request to pass through the network security device or performing one or more additional stages of network security processing (e.g., next-generation firewall processing, antivirus scanning, content filtering, data privacy protection, web filtering, intrusion prevention, intrusion detection, content filtering, application control, data leak prevention (DLP), antispam, antispyware, logging, reputation-based protections, event correlation, network access control, vulnerability management, and the like).

Figure 2A:
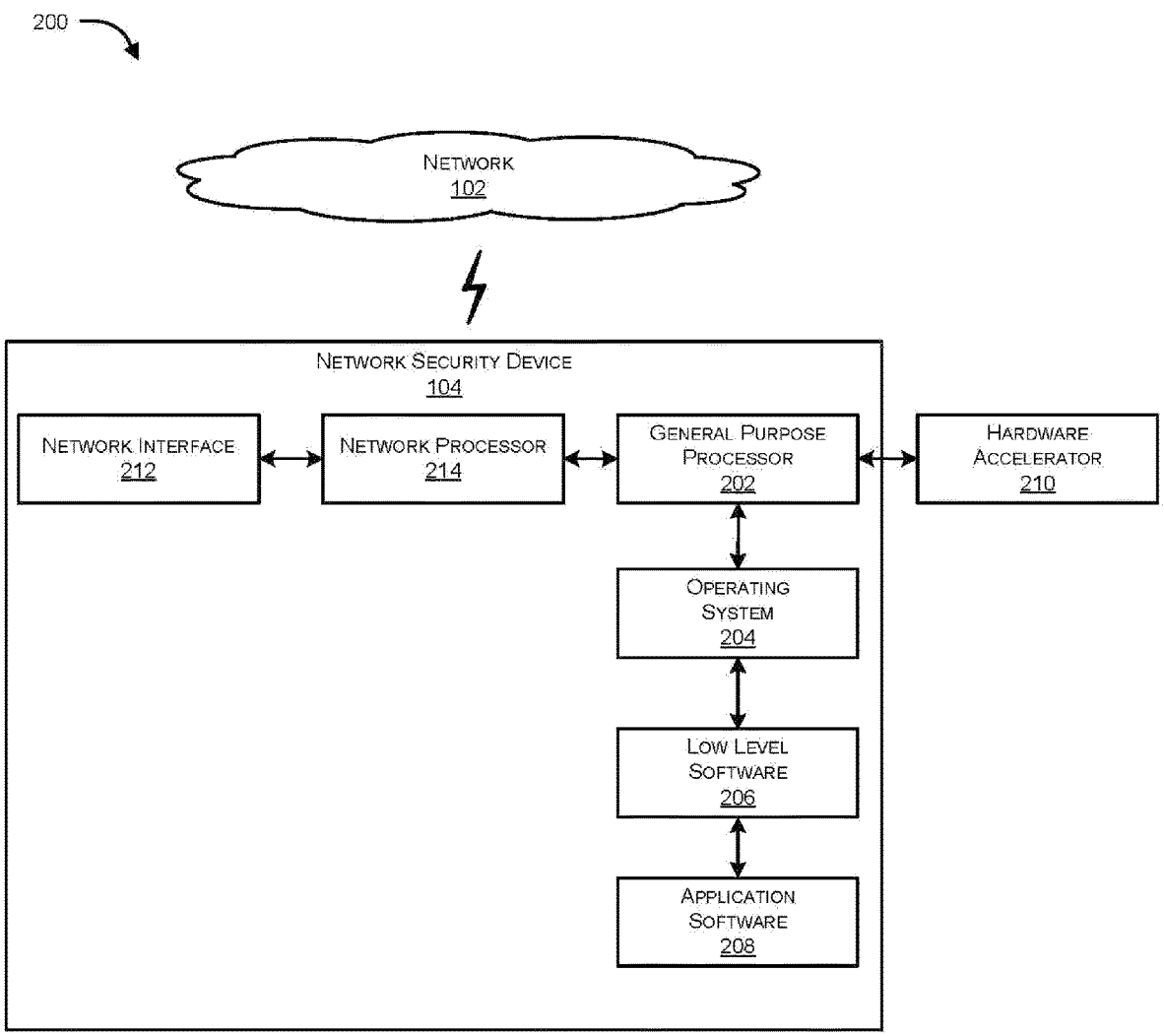
FIG. 2A is a block diagram illustrating an exemplary architecture of a network security device in which aspects of the present invention may be implemented in accordance with an embodiment of the present invention.

FIG. 2A is a block diagram 200 illustrating an exemplary architecture of a network security device in which aspects of the present invention may be implemented in accordance with an embodiment of the present invention. In the context of present example, a network security device 104 (e.g., a firewall appliance, a UTM appliance, an Intrusion Detection System (IDS)/Intrusion Prevention System (IPS), or the like) includes a network interface 212 that acts as a point of interconnection between network security device 104 and a network 102.

Network interface 212 can be operatively coupled to a network processor 214 for processing internet traffic and executing network applications. Network processor 214 can be operatively coupled to a processing resource (e.g., general purpose processor 202) for running compute-intensive applications at issue. General purpose processor 202 can run an operating system 204 for managing various computer resources and interfaces. Further, operating system 204 can run a program or group of programs designed for end users. A non-limiting example of operating system 106 is the FORTIOS network operating system, which is available from the assignee of the present invention.

These programs can be divided into two classes: low level software 206 and application software 208. While low level software 206 includes low-level programs that interact with computing devices at a basic level, application software 208 resides above system software and includes applications such as database programs, network security functionality and the like.

According to an embodiment, network security device 104 further includes a hardware accelerator 210, which is controlled by the general purpose processor 202. The hardware accelerator 210 may be used for hardware accelerating certain compute-intensive functions, such as those involving pattern matching. Hardware accelerator 210 operatively coupled to general purpose processor 202 and includes a hardware acceleration sub-system. The hardware acceleration sub-system is operable to update rate-based counters based on received application layer protocol requests (e.g., Hypertext Transport Protocol (HTTP) requests). For example, this can be done by performing a longest prefix match on a domain name and a path string by the general purpose processor 202 or by a pattern matching hardware module of the hardware acceleration sub-system. The pattern matching hardware module may also be used by IDS/IPS functionality to facilitate intrusion detection processing on network traffic received by the network security device.

Upon determination that a rate threshold associated with any of the rate-based counters is exceeded, a challenge message can be constructed. The challenge message may have embedded therein the application layer protocol request and may be transmitted to the client that originated the application layer protocol request at issue. The challenged message can include a Hypertext Markup Language (HTML) form or a Uniform Resource Locator (URL) with which an end user (to the extent the request was initiated as a result of human action and not a result of a bot) may interact to confirm the request was initiated as a result of human action. When a reply to the challenge message is received, the embedded application layer protocol request can be passed along to the next stage of processing. Further, when no rate thresholds associated with the rate-based counters are exceeded, a next stage of processing can be performed. The next stage of processing may include allowing the application layer protocol request to pass through the network security device or may include perform one or more additional stages of network security processing.

In an embodiment, network security device 104 can be implemented within a data center, and the hardware acceleration sub-system can be implemented within a network interface card (NIC) (e.g., a smart NIC). The processing resource that initially receives network traffic on behalf of the network security device 104 may be an embedded processor within the NIC and wherein said detecting and mitigating a DOS attack can be performed on behalf of a host within the data center without using a central processing unit (CPU) of the network security device. As will be appreciated by those skilled in the art, the hardware acceleration sub-system can learn the rate thresholds associated with the rate-based counters. For example, the rate thresholds may be learned periodically based on legitimate traffic. The rate-based counters may correspond to any or a combination of a request rate, a packet byte rate, and a session count.

Figure 2B:
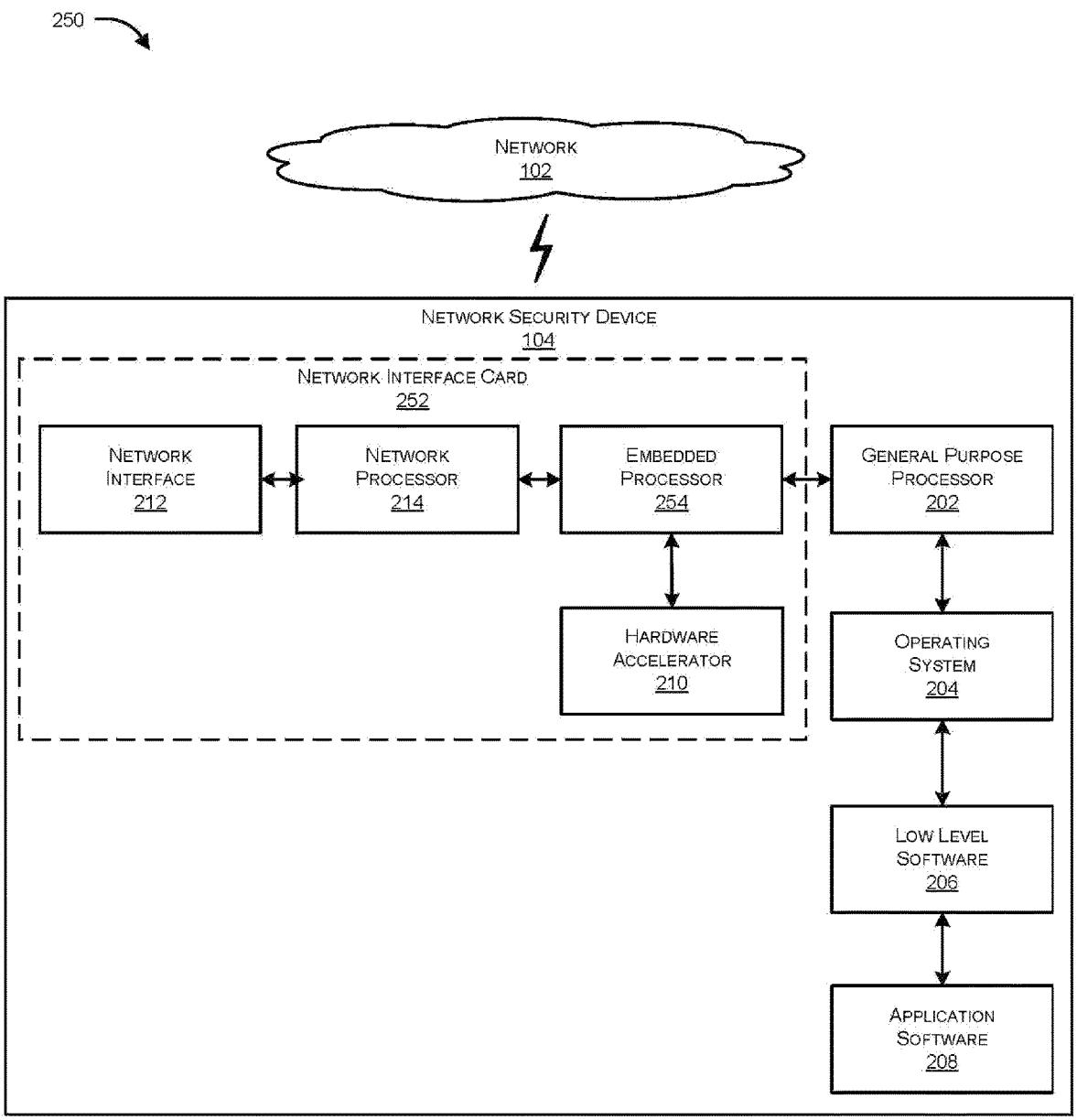
FIG. 2B is a block diagram illustrating an exemplary architecture of a network security device with a network interface card in accordance with an embodiment of the present invention.

FIG. 2B is a block diagram 250 illustrating an exemplary architecture of a network security device with a network interface card in accordance with an embodiment of the present invention. In context of the present example, to perform pattern matching using hardware accelerator 210, a network security device 104 can be operatively coupled with a Network Interface Card (NIC) 252 (e.g., a smart NIC). Network security device 104 can include a network interface 212 that can act as a point of interconnection between network security device 104 and a network 102. According to an embodiment, embedded processor 254 of NIC 252 can be operatively coupled to general purpose processor 202 of network security device 104. NIC 218 can further include network interface 218 that receives network traffic, and a network processor 214 that processes a network flow. Further, NIC 252 can include a hardware accelerator 210 operatively coupled with embedded processor 254. In an embodiment, a hardware acceleration sub-system of hardware accelerator 210 and a processing resource of general purpose processor 202 can be implemented within the NIC of the network security device.

Hardware accelerator 210 can be configured to perform detection and mitigation of a denial of service (DoS) attack by updating rate based counters as application layer protocol requests are received. For example, the hardware accelerator 210 may perform a longest prefix match on the domain name and the path string of an application layer protocol request. Further, network security device 104 can include operating system 204, low level software 206 and application software 208. In an embodiment, NIC 252 can be in the form of a discrete device that can be interfaced or operatively coupled with general purpose processor 202 of network security device 106 for providing effective hardware acceleration, for mitigating a DoS attack. Further, various functionality performed within NIC 252 may be made accessible to various other hosts or network nodes within a data center that area operatively coupled with the NIC without using CPU time of the network security device.

Figure 3:
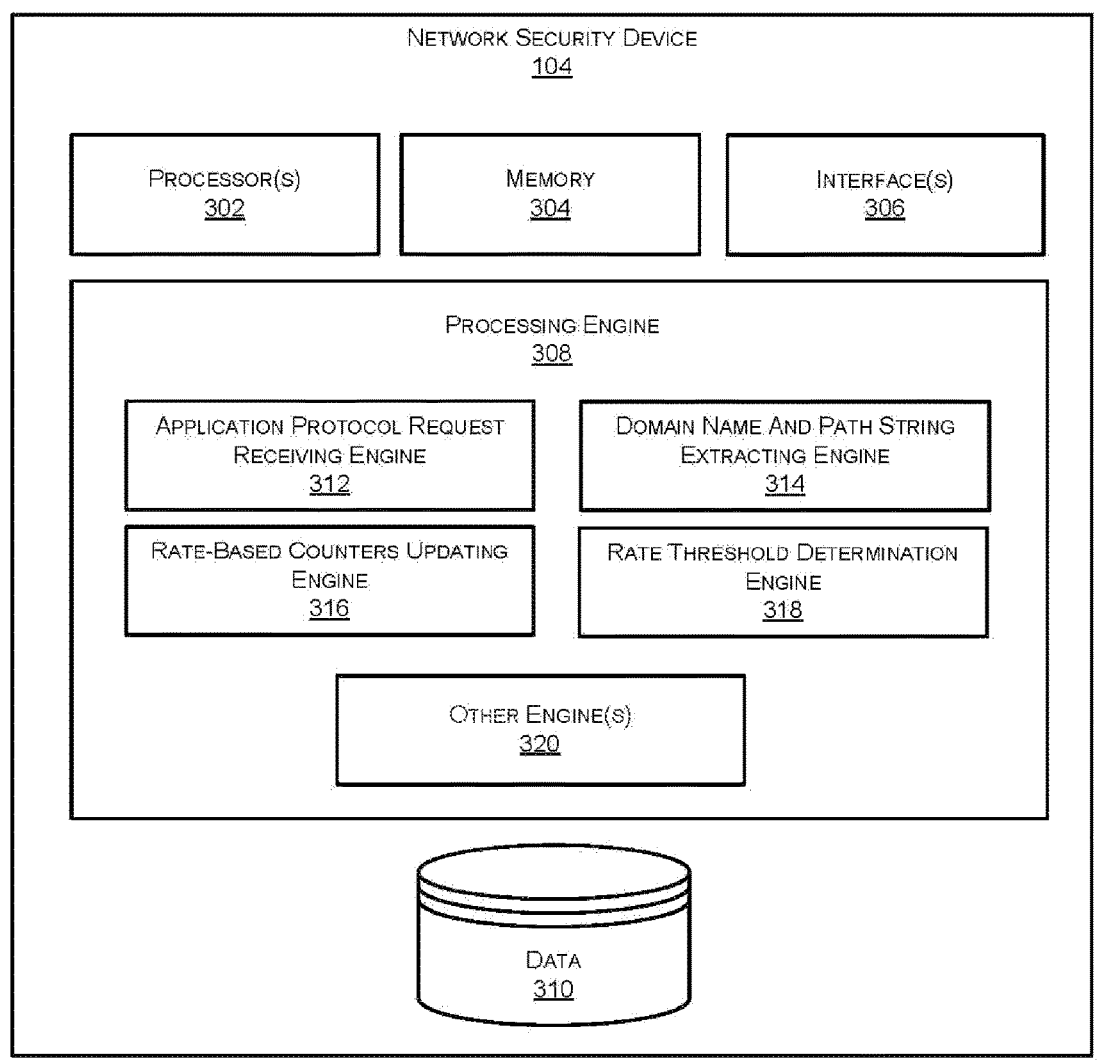
FIG. 3 is a block diagram illustrating functional components of a network security device in accordance with an embodiment of the present invention.

FIG. 3 is a block diagram 300 illustrating functional components of a network security device in accordance with an embodiment of the present invention. In the context of the present example, network security device 104 can include one or more processing resources (e.g., processor(s) 302). Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 304 of the network security device 104. Memory 304 can store one or more computer-readable instructions or routines, which may be fetched and executed to create or share the data units over a network service. Memory 304 can include any non-transitory storage device including, for example, volatile memory such as RAM, or non-volatile memory such as EPROM, flash memory, and the like. In an example embodiment, memory 304 may be a local memory or may be located remotely, such as a server, a file server, a data server, and the Cloud.

Network security device 104 can also include one or more Interface(s) 306. Interface(s) 306 may include a variety of interfaces, for example, interfaces for data input and output devices, referred to as I/O devices, storage devices, and the like. Interface(s) 306 may facilitate communication of network security device 104 with various devices coupled to network security device 104. Interface(s) 306 may also provide a communication pathway for one or more components of network security device 104. Examples of such components include, but are not limited to, processing engine(s) 308 and database 310.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) 308 may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, network security device 104 can include the machine-readable storage medium storing the instructions and the processing resource to execute the instructions, or the machine-readable storage medium may be separate but accessible to network security device 104 and the processing resource. In other examples, processing engine(s) 308 may be implemented by electronic circuitry. Database 310 can include data that is either stored or generated as a result of functionalities implemented by any of the components of processing engine(s) 308.

In an example, processing engine(s) 308 can include an application layer protocol request receiving engine 312, a domain name and path string extracting engine 314, a rate-based counters updating engine 316, a rate threshold determination engine 318, and other engine(s) 320. Other engine(s) 320 can implement functionalities that supplement applications or functions performed by network security device 104 or processing engine(s) 308.

According to an embodiment, application layer protocol request receiving engine 312 may receive an application layer protocol request from a client directed to a domain hosted by one or more servers that are protected by the network security device. The application layer protocol request may include a Hypertext Transport Protocol (HTTP) request. A domain name and path string extracting engine 314, may extract a domain name and a path string from received application layer protocol requests by parsing the application layer protocol requests. Rate-based counters updating engine 316 may facilitate a hardware acceleration sub-system of the network security device to update rate-based counters based on the application layer protocol request by performing a longest prefix match on the domain name and the path string. The longest prefix match may be performed by a pattern matching hardware module of the hardware acceleration sub-system. In addition, the pattern matching hardware module may be used to perform intrusion detection processing on network traffic received by the network security device. The rate threshold determination engine 318 may determine when a rate threshold associated with any of the rate-based counters is exceeding. In case the rate-based counters is exceeded, the hardware acceleration sub-system may construct a challenge message to confirm the application layer protocol request at issue was as a result of human activity. The challenge message may have embedded therein the application layer protocol request. The hardware acceleration sub-system may cause the challenge message to be transmitted to the client that originated the application layer protocol request at issue. The challenge message may include a Hypertext Markup Language (HTML) form or a Uniform Resource Locator (URL) to be presented to an end user of the client. When a reply to the challenge message is received (confirming the application layer protocol request at issue was as a result of human interaction), the embedded application layer protocol request is passed along to the next stage of processing. When no rate thresholds associated with the rate-based counters are exceeded, a next stage of processing is performed and includes allowing the application layer protocol request to pass through the network security device or performing one or more additional stages of network security processing.

Figure 4:
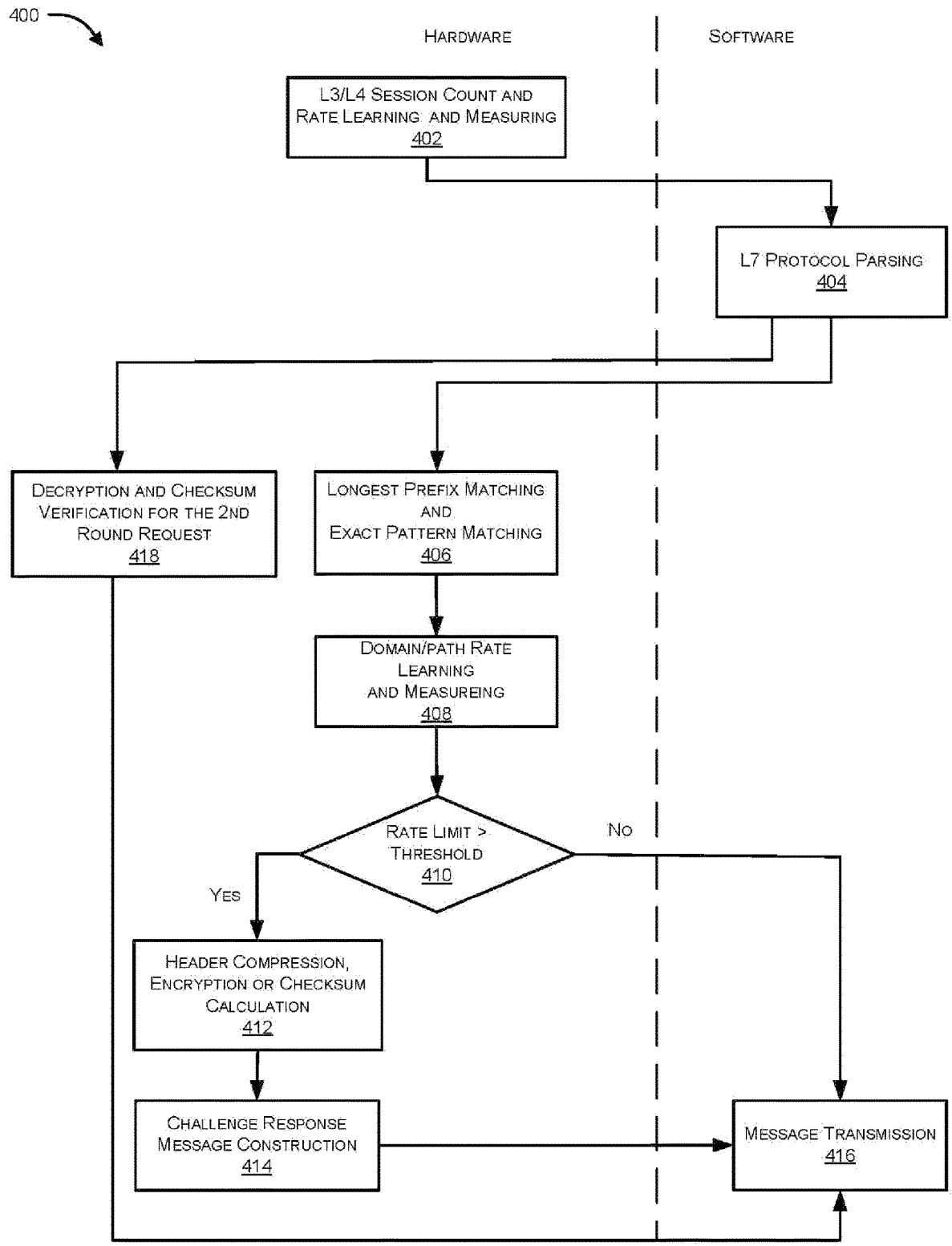
FIG. 4 is a high-level flow diagram illustrating an exemplary hardware accelerator as implemented in the network security device in accordance with an embodiment of the present invention.

FIG. 4 is a high-level flow diagram 400 illustrating an exemplary hardware accelerator as implemented in the network security device in accordance with an embodiment of the present invention. In the context of the present example, some operations are shown as implemented in hardware (e.g., hardware accelerator 210 of FIG. 2A or FIG. 2B) and other are shown as being implemented in software (e.g., running on general purpose processor 202 or embedded processor 254 of FIG. 2A or 2B). Those skilled in the art will appreciate more or fewer operations than depicted in this example may be performed in hardware or software. In some embodiments, all operations are performed in software. The functions on the hardware side of the diagram may be implemented in an application-specific integrated circuit (ASIC) or a set of ASICs, while the functions on the software side may be implemented on general purpose processors or embedded processors. When an application layer protocol request (e.g., a Hypertext Transport Protocol (HTTP) request) is received from a client, at block 402, rate based counters (e.g., session counts and rate thresholds) may be determined and measured for Layer 3 and Layer 4. In an embodiment, for TCP traffic, synchronize (SYN) cache and SYN cookie methods may be implemented in block 402.

The measurements may include one or more of per-source Internet Protocol (IP) address session counts, per-source IP address session rates, per-destination IP address session counts, and per-destination IP address session rates. In addition, source and destination port numbers may also be used to define the session counts and the session rates. On the software front at block 404, L7 protocol parsing may be performed to determine a domain name and a path string from the received HTTP request. The determined domain name and path string may be passed to block 406 along with the original URL, original header, and original body if any of the HTTP request.

At block 406, on the hardware front, a longest prefix match and an exact pattern match may be performed to the domain name and the path string. In an embodiment, the exact pattern matching hardware may also be used to accelerate IDS/IPS functionality performed by the network security device. For matching, block 406 may be configured with predetermined domain names and information related to various depth of paths that need to be protected. A non-limiting example of a hardware architecture that may be used to perform the longest prefix matching and exact pattern matching is described further below with reference to FIG. 7.

At block 408, based on the determined rate of matching of the domain name and path string, the rate-based counters may be updated. For updating and driving the rate-based counters, generated indexes from block 406 pertaining to the matching may be sent to block 408. As will be appreciated by those skilled in the art, a single server may host one or more domain names. Further, in accordance with an embodiment operations performed at block 402 and 408 may share a common set of hardware resources of the hardware accelerator. A non-limiting example of a hardware architecture that may be used to perform measurement and/or learning of rate thresholds is described further below with reference to FIG. 8.

At block, 410, it may be determined whether a rate threshold associated with any of the rate-based counters is exceeded. In an embodiment, the rate threshold may be set manually or may be updated by continuous learning. Further, the rate threshold may be identified by any combination of HTTP methods, domain names and paths.

Upon determining that no rate thresholds associated with the rate-based counters are exceeded, a next stage of processing is performed, at block 416, for message transmission. Depending upon the particular implementation, the next stage of processing may include allowing the HTTP request to pass through the network security device or may involve performing various additional stages of network security processing.

Upon determination at block 410, that a rate threshold associated with any of the rate-based counters is exceeded, a hardware acceleration sub-system of the hardware accelerator, at block 412, performs a header compression, encryption or checksum calculation on the HTTP request to construct a challenge message at block 414. The challenge message may also have content of the HTTP request embedded therein. The challenge message may be encrypted or checksum of the message may be created using a secret number as a key, which may change periodically at the end of a time window. In an embodiment, the challenge message may be embedded in a Hypertext Markup Language (HTML) form, and information related to the challenge message may be embedded in a Uniform Resource Locator (URL).

The challenge message may be transmitted to the client at block 416. At block 418, a decryption and/or checksum verification may be performed on/for the HTTP request as appropriate for the second round request (e.g., the challenge message response received from the client) and when successful, the embedded HTTP request may be sent to the next stage of processing (e.g., message transmission 416 in the context of the present example).

Figure 5:
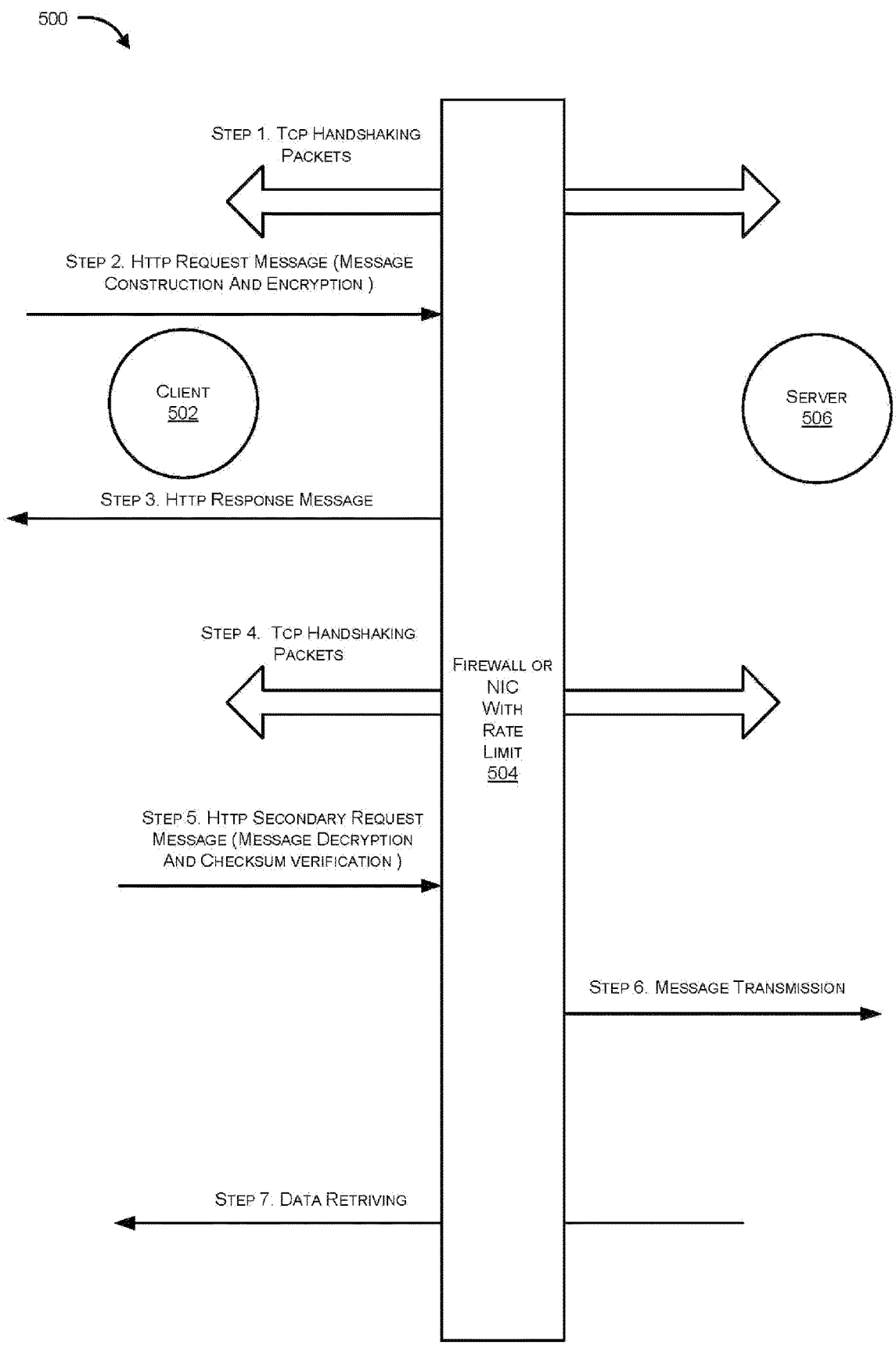
FIG. 5 is a high-level flow diagram illustrating an exemplary transaction between a client and a server via a network security device in accordance with an embodiment of the present invention.

FIG. 5 is a high-level flow diagram 500 illustrating an exemplary transaction between a client device 502 and a server 506 via a network security device 504 in accordance with an embodiment of the present invention. In the context of the present example, the network security device may include a firewall and/or a network interface card (NIC) (e.g., a smart NIC) 504, with a predetermined rate threshold and may sit in between (e.g., be logically interposed between) client device 502 and server 506 during the transaction. For example, at step 1 for executing a Transmission Control Protocol (TCP) transaction, TCP handshaking packets and possible SYN cookie packets may be exchanged. At step 2, an HTTP request message may be sent from client device 502 to server 506. Upon receiving the request message, the rate-based counters may be updated and the corresponding thresholds checked. For example, the HTTP request message may be processed as described above with reference to blocks 404, 406 and 408 of FIG. 4. When the HTTP request is identified as being part of a potential DoS attack (e.g., any of the rate-based thresholds have been exceeded), an HTTP response message (e.g., in the form of a challenge message) is returned to the client 502 to confirm the existence of a human operator associated with the client 502.

In an embodiment, construction of the challenge message at step 3 may be performed responsive to a rate threshold associated with any of the rate-based counters being exceeded as a result of the request message received at step 2. The challenge message may be generated and transmitted to the client as described above with reference to blocks 412, 414, and 416 of FIG. 4. For example, the constructed challenge message may include complete information regarding the original request message. For security, the original request message may be embedded in the challenge message in the form of an encrypted version of the request message or a plaintext version of the request message with an appended checksum. As noted above, the challenge message may comprise an HTML form or a URL with which the user (to the extent one is present) of the client is directed to interact to confirm the request received at step 2 was initiated by them.

When the client device 502 is a compromised client device (e.g., a zombie being used to participate in a DoS or distributed DoS (DDoS)), it is not expected to send a response to the challenge message generated at step 2, and when the client device 502 is a legitimate client device, the human operator is expected send a response to the challenge message generated at step 3.

At step 4, TCP handshaking packets and possible SYN cookie packets may be exchanged. If client device 502 is a legitimate client and the user confirms they initiated the request received at step 2 by responding to the challenge message (e.g., by interacting with the HTML form or URL), then at step 5, a secondary request message (the response to the challenge message) is received and processed by the network security device 504.

The challenge response may be processed as discussed with reference to 402, 404, and 418 of FIG. 4. For example, decryption or checksum verification may be performed and the request message embedded within the challenge response may be transmitted to the server 506. As attackers do not have the secret number used for encryption of the challenge message, the embedded request message (from step 2) is trustworthy as it should not be able to be forged. When the decryption and/or checksum verification is completed successfully, the client device is deemed to be legitimate and the embedded request message is transmitted at step 6, thereby allowing the client 502 to receive the requested data from the server 506 at step 7.

Figure 6:
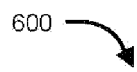
FIG. 6 illustrates exemplary rules to define two rate counters in accordance with an embodiment of the present invention.

FIG. 6 illustrates exemplary rules 600 defining two rate counters in accordance with an embodiment of the present invention. Depending upon the particular implementation the rate counters may be expressed as rules having one or more conditions. For example, the conditions may include one or more of an HTTP method, a domain name, and a path string. Alternatively, the rate counters may be expressed in terms of layer 3 and/or layer 4 parameters.

In the context of the present example, two example rate counters (i.e., a first rate counter 602 and a second rate counter 604) are shown for purposes of illustration. The first rate counter 602, counts HTTP requests containing the HTTP GET method and matching the specified host string or host regular expression and the specified path string and/or path regular expression. The second rate counter 604, counts application layer protocol requests directed to a particular destination IP address (e.g., 1.1.1.1), using a particular layer 4 protocol (e.g., TCP), and directed to a particular layer 4 port (e.g., port 80). Those skilled in the art will appreciate a variety of different rate counters may be created by an administrator of a network security device (e.g., network security device 104) as appropriate for detecting and mitigating DoS attacks directed at the particular domains hosted by one or more servers protected by the network security device.

Figure 7:
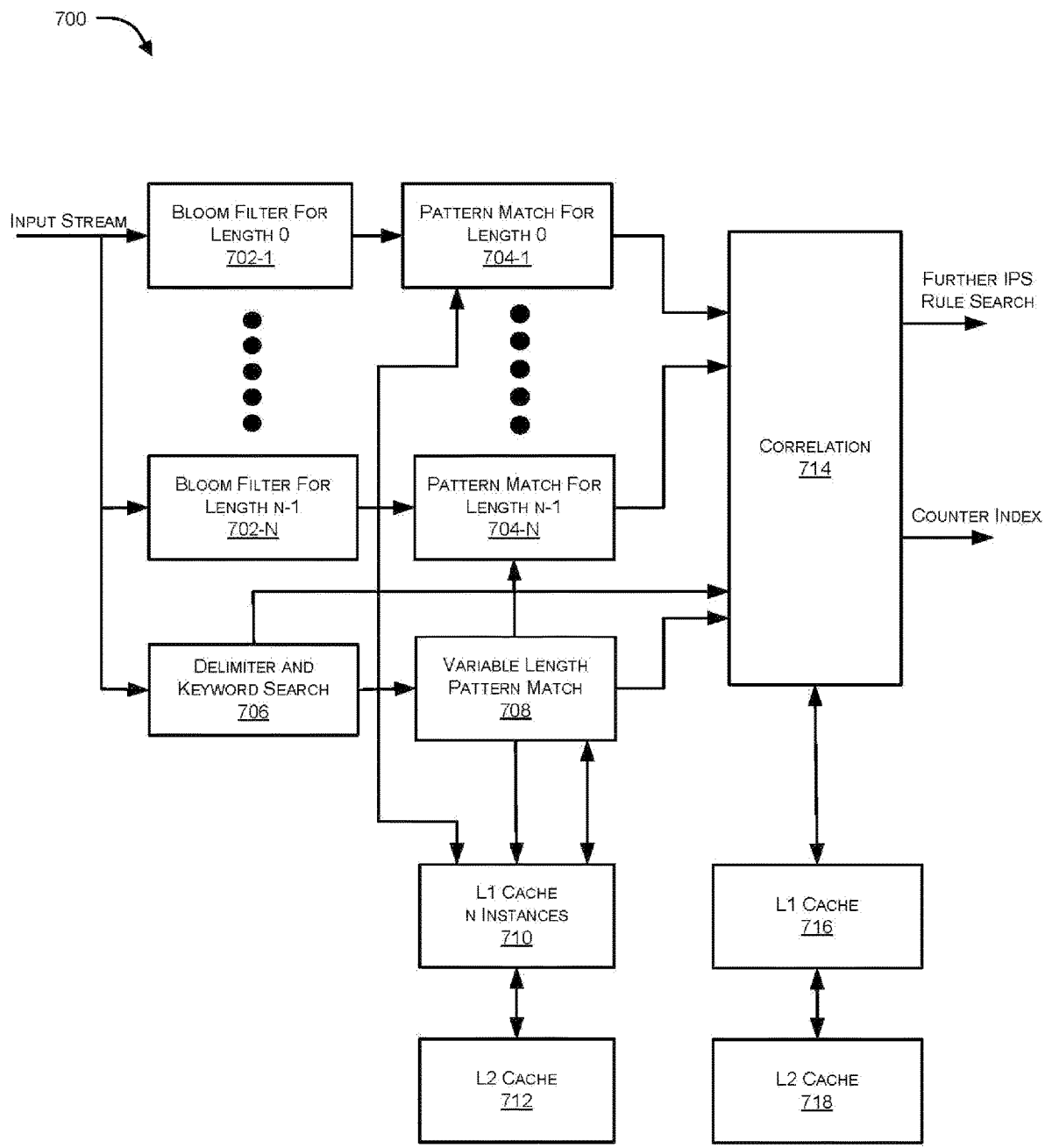
FIG. 7 is a block diagram illustrating a hardware architecture for performing prefix matching and/or pattern matching in accordance with an embodiment of the present invention.

FIG. 7 is a block diagram illustrating a hardware architecture 700 for performing prefix matching and/or pattern matching in accordance with an embodiment of the present invention. According to an embodiment, multiple bloom filters 702-1, 702-2 . . . 702-N (which may be collectively referred to herein as bloom filters 702) may be arranged for example, in parallel with each other. Each of the bloom filters 702 may be specifically selected to operate on a particular length of the input stream. The arrangement of bloom filters 702 may thus help in determining a range of length of the input stream.

In an embodiment, multiple bloom filters 702 may be arranged in a number of levels in accordance with the length of input to which they apply. For example, bloom filter for length 0 may be arranged at level 1, bloom filter for length 1 may be arranged at level 2 and bloom filter for length N−1 may be arranged at level N. In yet another embodiment, multiple pattern match modules 704-1, 704-2 . . . 704-N (which may be collectively referred to herein as pattern match modules 704) may be arranged for example, in parallel to each other. Each of the pattern match modules 704 may be specifically selected to perform a pattern and a string match on the input stream of a particular length against a pattern within a group of patterns of certain length.

At block 706, a delimiter and keyword search may be performed on the received input stream. This may be done by locating starting delimiters. For example, following the location of a starting delimiter, the input stream of packets may be fed into block 708 until a corresponding ending delimiter is reached.

At block 708, floating pattern matching and fixed location pattern matching may be performed. In accordance with an embodiment, the pattern matching may be implemented using a deterministic finite automaton (DFA). In yet another embodiment, the pattern matching may be implemented using a special purpose or general purpose processor.

At block 710 is shown a level 1 (L1) cache for each of the pattern matching modules, while at block 712 is shown a level 2 (L2) cache corresponding to all the L1 caches. The correlation module 714 may compute a correlation between all the matched patterns and conditions to generate rule IDs (e.g., a counter index) of the rules whose conditions are matched. Further, the correlation module may also make use of an L1 cache 716 and an L2 cache 718.

Figure 8:
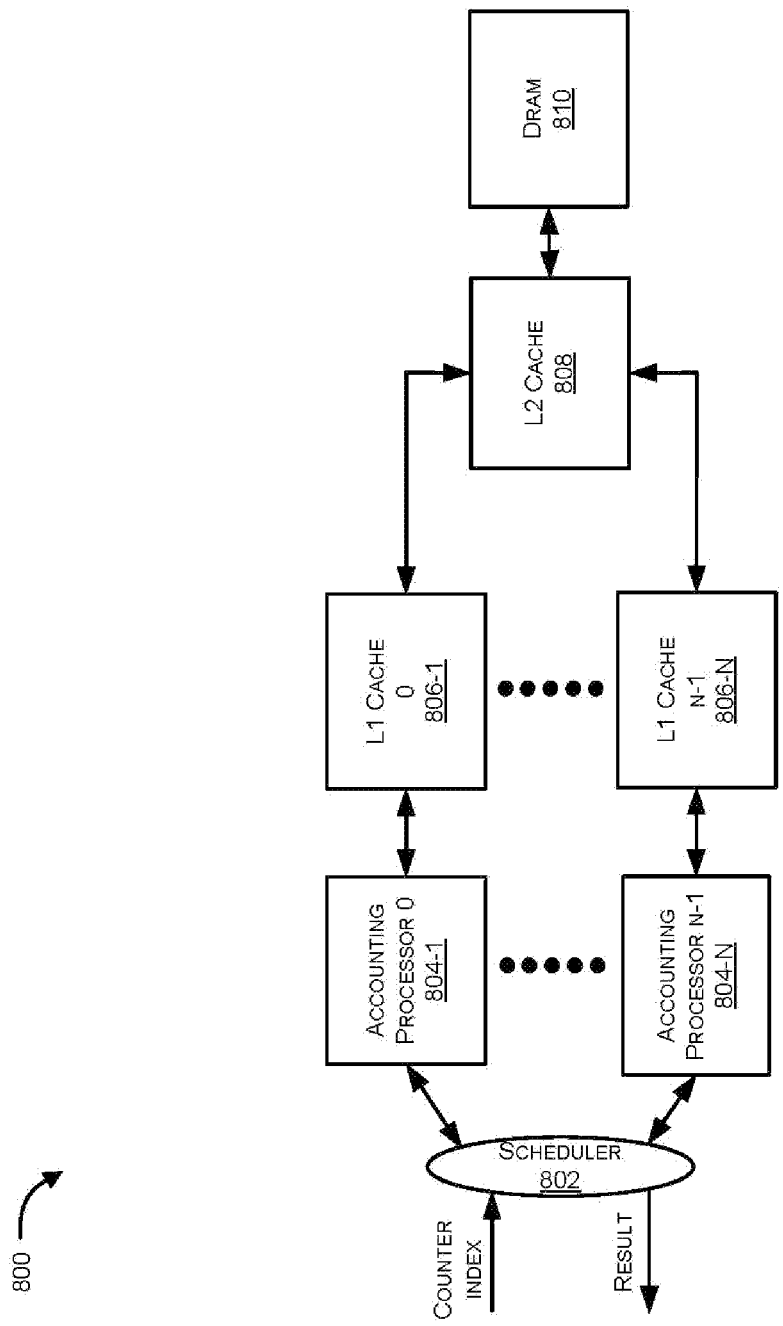
FIG. 8 is a block diagram illustrating a hardware architecture for measurement and/or learning of rate thresholds in accordance with an embodiment of the present invention.

FIG. 8 is a block diagram illustrating a hardware architecture for measurement and/or learning of rate thresholds in accordance with an embodiment of the present invention. In an embodiment, multiple accounting processors 804-1, 804-2 . . . 804-N (which may be collectively referred to herein as accounting processor 804) may be arranged for example, in parallel to each other to receive counter indexes (e.g., generated at block 408 of FIG. 4 or output by correlation module 714 of FIG. 7) passed along via a scheduler 802. Upon receiving the counter indexes, corresponding accounting entries from accounting processor 804 may be read through L1 cache 806, L2 cache 808 or DRAM 810. Each one of the accounting entries may include, for example, a combination of one or more of a request rate, a packet byte rate, a session count, and their corresponding threshold values. An accounting entry may also include the result of a previous measurement window and may optionally enforce a "penalty" window. The accounting processors may optionally report a set of accounting entries corresponding to the rate threshold to a hardware accelerated processor periodically so that the rate threshold may learn a base line of each accounting entry over the time.

Figure 9:
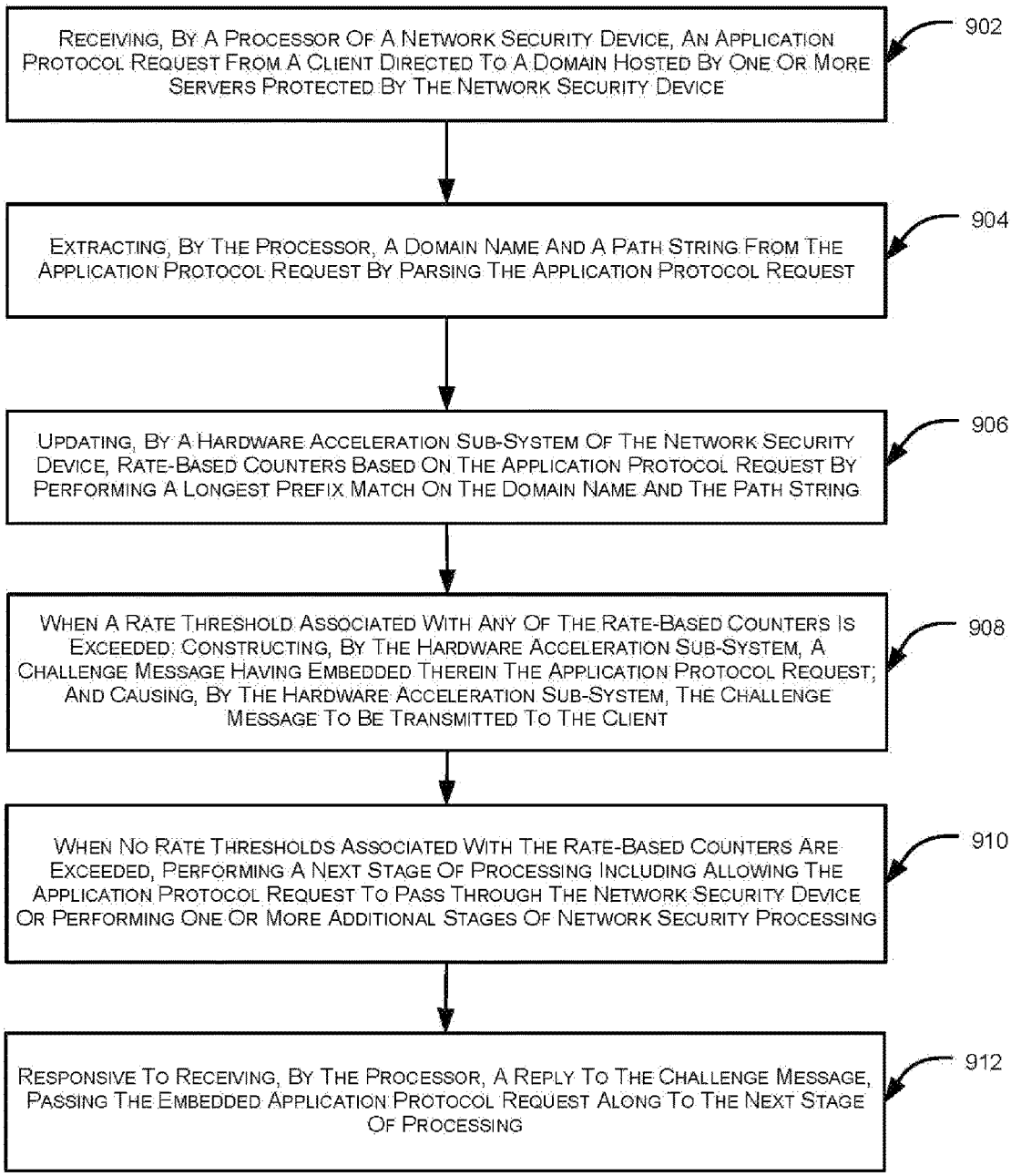
FIG. 9 is a flow diagram illustrating an exemplary process for detection and mitigation of DoS attack in accordance with an embodiment of the present invention.

FIG. 9 is a flow diagram 900 illustrating an exemplary process for detection and mitigation of DoS attack in accordance with an embodiment of the present invention. The process described with reference to FIG. 9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 1000 described with reference to FIG. 10 below.

In the context of the present example, at block 902, a processor of a network security device receives an application layer protocol request from a client directed to a domain hosted by one or more servers protected by the network security device. For example, general purpose processor 202 or embedded processor 254 of network security device 104 may receive an HTTP request from client 502.

At block 904, the processor extracts a domain name and a path string from the application layer protocol request by parsing the application layer protocol request.

At block 906, the processor or a hardware acceleration sub-system of the network security device, updates rate-based counters based on the application layer protocol request by performing a longest prefix match on the domain name and the path string.

At block 908, upon determination that a rate threshold associated with any of the rate-based counters is exceeded, the processor or the hardware acceleration sub-system, constructs a challenge message having embedded therein the application layer protocol request, and causes the challenge message to be transmitted to the client.

At block 910, when no rate thresholds associated with the rate-based counters are exceeded, a next stage of processing is performed, which may include allowing the application layer protocol request to pass through the network security device or performing one or more additional stages of network security processing.

At block 912, when a reply to the challenge message is received, the processor passes the embedded application layer protocol request contained therein along to the next stage of processing.

Figure 10:
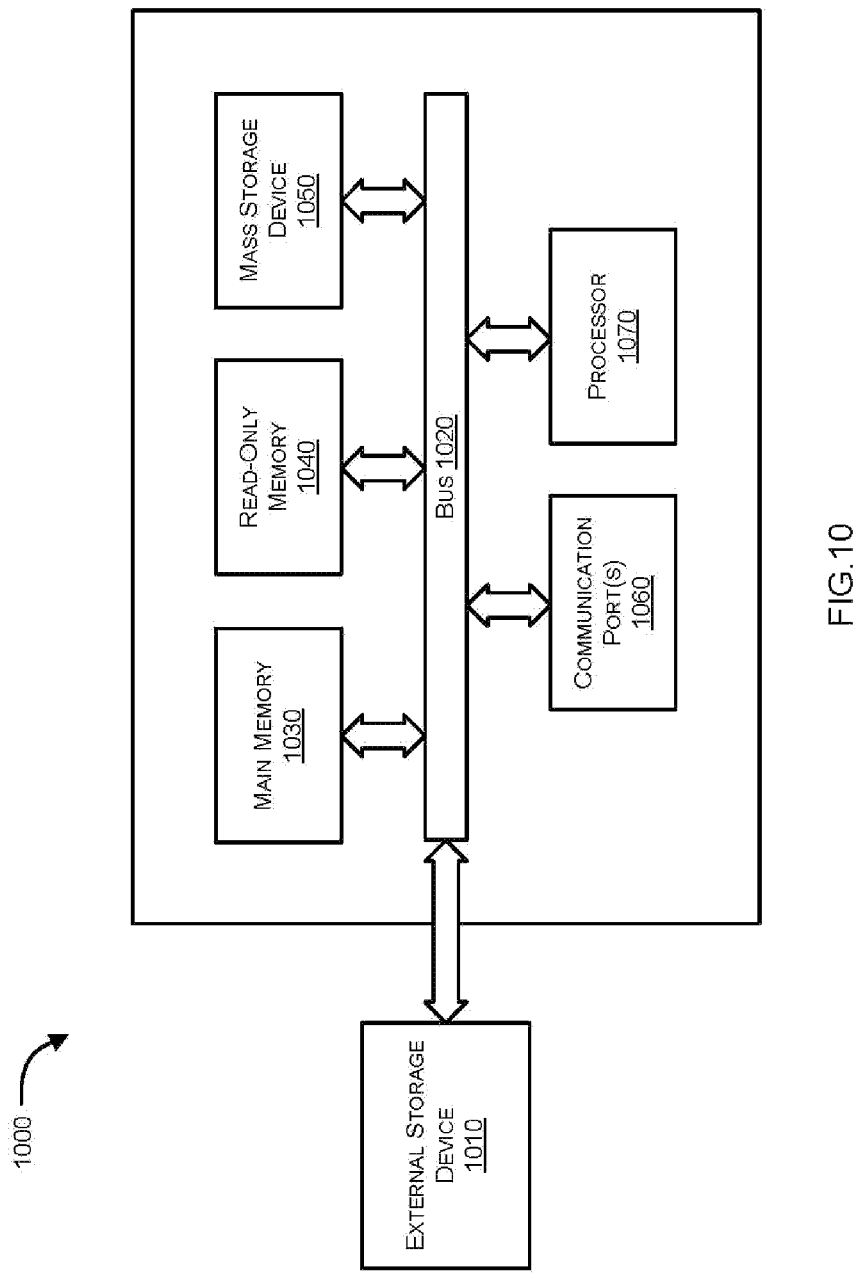
FIG. 10 illustrates an exemplary computer system in which or with which embodiment of the present invention may be utilized.

FIG. 10 illustrates an exemplary computer system 1000 in which or with which embodiment of the present invention may be utilized. As shown in FIG. 10, computer system includes an external storage device 1010, a bus 1020, a main memory 1030, a read only memory 1040, a mass storage device 1050, a communication port 1060, and a processor 1070. In one embodiment, computer system 1000 may represent some portion of a network security device (e.g., network security device 104 of FIG. 1, FIG. 2A, and FIG. 2B).

Those skilled in the art will appreciate that computer system 1000 may include more than one processor 1070 and communication ports 1060. Examples of processor 1070 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1070 may include various modules associated with embodiments of the present invention.

Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g. start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1060. External storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for detecting and mitigating a denial of service (DoS) attack, the method comprising:
   extracting, by a processor of a network security device, a domain name and a path string from a received application layer protocol request;
   updating, by a hardware acceleration sub-system of the network security device, rate-based counters based on the application layer protocol request;
   when a rate threshold associated with any of the rate-based counters is exceeded:
      constructing, by the hardware acceleration sub-system, a challenge message having embedded therein the application layer protocol request; and
      causing, by the hardware acceleration sub-system, the challenge message to be transmitted to the client; and
   responsive to receiving, by the processor, a reply to the challenge message, passing the embedded application layer protocol request along to the next stage of processing.

2. The method of claim 1, wherein the updating the rate based counters based on the application layer protocol request is done by performing a longest prefix match on the domain name and the path string.

3. The method of claim 2, wherein said performing a longest prefix match is performed by a pattern matching hardware module of the hardware acceleration sub-system and wherein the method further comprises making use of the pattern matching hardware module to perform intrusion detection processing on network traffic received by the network security device.

4. The method of claim 1, the method further comprising:
   when no rate thresholds associated with the rate-based counters are exceeded, performing a next stage of processing including allowing the application layer protocol request to pass through the network security device or performing one or more additional stages of network security processing.

5. The method of claim 1, wherein the application layer protocol request comprises a Hypertext Transport Protocol (HTTP) request.

6. The method of claim 1, wherein the network security device is within a data center, wherein the hardware acceleration sub-system is implemented within a network interface card (NIC), wherein the processor comprises an embedded processor within the NIC and wherein said detecting and mitigating a DOS attack is performed on behalf of a host within the data center without using a central processing unit (CPU) of the network security device.

7. The method of claim 1, wherein the challenged message comprises a Hypertext Markup Language (HTML) form or a Uniform Resource Locator (URL) to be presented to an end user of the client.

8. The method of claim 1, wherein the hardware acceleration sub-system learns the rate thresholds associated with the rate-based counters, the rate-based counters corresponding to any or a combination of a request rate, a packet byte rate, and a session count.

9. A network security device for detecting and mitigating a denial of service (DoS) attack, the device comprising:
   a hardware acceleration sub-system operable to:
      update rate-based counters based on an application layer protocol request;
      when a rate threshold associated with any of the rate-based counters is exceeded:
         construct a challenge message having embedded therein the application layer protocol request; and
         cause the challenge message to be transmitted to a client;
   a processing resource; and
   a non-transitory computer-readable medium, coupled to the processing resource, having stored therein instructions that when executed by the processing resource cause the processing resource to:
      receive an application layer protocol request from the client directed to a domain hosted by one or more servers protected by the network security device;
      extract the domain name and the path string from the application layer protocol request by parsing the application layer protocol request; and
      in response to receiving a reply to the challenge message, pass the embedded application layer protocol request along to the next stage of processing.

10. The network security device of claim 9, wherein the updating the rate-based counters based on an application layer protocol request is done by performing a longest prefix match on a domain name and a path string.

11. The network security device of claim 10, wherein said performing a longest prefix match is performed by a pattern matching hardware module of the hardware acceleration sub-system and wherein the pattern matching hardware module performs intrusion detection processing on network traffic received by the network security device.

12. The network security device of claim 9, wherein the hardware acceleration sub-system is further operable to:
   when no rate thresholds associated with the rate-based counters are exceeded, perform a next stage of processing that includes allowing the application layer protocol request to pass through the network security device or perform one or more additional stages of network security processing.

13. The network security device of claim 9, wherein the application layer protocol request comprises a Hypertext Transport Protocol (HTTP) request.

14. The network security device of claim 9, wherein the network security device is within a data center, wherein the hardware acceleration sub-system is implemented within a network interface card (NIC), wherein the processing resource comprises an embedded processor within the NIC and wherein said detecting and mitigating a DOS attack is performed on behalf of a host within the data center without using a central processing unit (CPU) of the network security device.

15. The network security device of claim 9, wherein said performing a longest prefix match is performed by a pattern matching hardware module of the hardware acceleration sub-system and wherein the pattern matching hardware module performs intrusion detection processing on network traffic received by the network security device.

16. The network security device of claim 9, wherein the challenged message comprises a Hypertext Markup Language (HTML) form or a Uniform Resource Locator (URL) to be presented to an end user of the client.

17. The network security device of claim 9, wherein the hardware acceleration sub-system learns the rate thresholds associated with the rate-based counters, the rate-based counters corresponding to any or a combination of a request rate, a packet byte rate, and a session count.

18. A non-transitory computer-readable storage medium embodying a set of instructions, which when executed by one or more processors of a network security device, causes the one or more processors to perform a method comprising:
    extracting, by a processor of a network security device, a domain name and a path string from a received application layer protocol request;
    updating, by a hardware acceleration sub-system of the network security device, rate-based counters based on the application layer protocol request;
    when a rate threshold associated with any of the rate-based counters is exceeded:
        constructing, by the hardware acceleration sub-system, a challenge message having embedded therein the application layer protocol request; and
        causing, by the hardware acceleration sub-system, the challenge message to be transmitted to the client; and
    responsive to receiving, by the processor, a reply to the challenge message, passing the embedded application layer protocol request along to the next stage of processing.

19. The non-transitory computer-readable storage medium of claim 18, wherein the updating the rate based counters based on the application layer protocol request is done by performing a longest prefix match on the domain name and the path string.

20. The non-transitory computer-readable storage medium of claim 19, wherein said performing a longest prefix match is performed by a pattern matching hardware module of the hardware acceleration sub-system and wherein the method further comprises making use of the pattern matching hardware module to perform intrusion detection processing on network traffic received by the network security device.

21. The non-transitory computer-readable storage medium of claim 18, wherein the non-transitory computer-readable storage medium embodying the set of instructions, which when executed by one or more processors of a network security device, further causes the one or more processors to:
    when no rate thresholds associated with the rate-based counters are exceeded, performing a next stage of processing including allowing the application layer protocol request to pass through the network security device or performing one or more additional stages of network security processing.

* * * * *